United States Patent
Beelitz

(10) Patent No.: US 6,237,137 B1
(45) Date of Patent: *May 22, 2001

(54) METHOD AND SYSTEM FOR PREVENTING UNAUTHORIZED ACCESS TO A COMPUTER PROGRAM

(75) Inventor: Alan E. Beelitz, Austin, TX (US)

(73) Assignee: Dell USA, L.P., Round Rock, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,626

(22) Filed: Oct. 15, 1997

(51) Int. Cl.[7] ........................................ G06F 9/45
(52) U.S. Cl. .................................. 717/4; 710/261
(58) Field of Search ........................ 395/704; 710/261; 713/323, 601; 714/38

(56) References Cited

U.S. PATENT DOCUMENTS

| | | | | |
|---|---|---|---|---|
| 4,525,780 | * | 6/1985 | Bratt et al. | 711/163 |
| 4,819,234 | * | 4/1989 | Huber | 714/38 |
| 5,083,266 | * | 1/1992 | Watanabe | 713/601 |
| 5,159,688 | * | 10/1992 | Matsushima et al. | 710/261 |
| 5,432,795 | * | 7/1995 | Robinson | 395/704 |
| 5,446,900 | * | 8/1995 | Kimelman | 717/704 |
| 5,671,422 | * | 9/1997 | Datta | 710/261 |
| 5,765,004 | * | 6/1998 | Foster et al. | 713/323 |
| 5,903,766 | * | 5/1999 | Walker et al. | 713/323 |

FOREIGN PATENT DOCUMENTS

| | | | |
|---|---|---|---|
| 0062438A2 | 10/1982 | (EP) . | |
| 58-094195 | 6/1983 | (JP) | G11C/17/60 |
| 62-126448 | 6/1987 | (JP) | G06F/12/14 |
| WO 82/04356 | 12/1983 | (WO) . | |
| WO 97/04394 | 2/1997 | (WO) | G06F/12/14 |

\* cited by examiner

*Primary Examiner*—Mark Powell
*Assistant Examiner*—Hoang-Vu Anthony Nguyen-Ba
(74) *Attorney, Agent, or Firm*—Haynes and Boone, LLP

(57) ABSTRACT

A system and method for preventing a program from being run under a debugger utility program. The method is part of a routine which is stored along with a software program on a hard drive of a computer system. The computer system has a processor for running both the software program and the routine and is capable of operating in a debug mode. The routine prevents unauthorized access to the software program, such as when the processor is running in the debug mode. When the processor is running the software program, the program can initiate execution of the routine. Once initiated, the routine checks a certain registers of the processor to determine if it is operating in the debug mode and if so, stops the processor from continuing to run the software program.

20 Claims, 1 Drawing Sheet

METHOD AND SYSTEM FOR PREVENTING UNAUTHORIZED ACCESS TO A COMPUTER PROGRAM

BACKGROUND

The present disclosure relates generally to computers and computer programs, and, more specifically, to a system and method for preventing programs from being run under a debugger utility program.

A computer program that is stored inside a computer often contains many protectable intellectual properties. Certain ones of these properties are readily protectable through copyright and/or patent laws. However, others of these properties are protectable as trade secrets, and therefore require the utmost level of security to prevent unauthorized use or access.

Preventing unauthorized use or access of a particular program becomes difficult once the program is attained by a user who is not subject to software licenses or other forms of protection. For example, diagnostic programs are often installed on a computer by the computer's manufacturer and contain many trade secrets of the manufacturer. Typically, only the executable (.exe) portion of the program is installed, thereby keeping the source code from the user. Further, the .exe portion of the program is often encrypted. For example, a utility program PKLITE from PKWARE, Inc. of Brown Deer, Wis., compresses the .exe portion of the program, thereby encrypting it in the process. However, this does not prevent a user from running the program through a debugger utility program. The debugger utility program makes the computer's processor operate in a suspended execution mode which causes the processor to stop execution or jump to another routine at certain, predefined intervals. For the sake of example, the processor may be a PENTIUM processor, as produced by Intel, Corp. of Santa Clara, Calif., and examples of suspended execution modes include a debug and a single-step operating mode, all of which are described in greater detail in the INTEL ARCHITECTURE SOFTWARE DEVELOPER'S MANUAL, Vols. 1–3, 1997, provided by Intel Corporation, which is hereby incorporated by reference. By using the debugger program, the user can wrongfully access the program, thereby accessing the trade secrets stored therein.

Therefore, what is needed is a system and method that would prevent unauthorized access of a program, even through a debugger utility program.

SUMMARY

In response thereto, provided is a system and method for preventing a program from being run under a debugger utility program. In one embodiment, a routine and a software program are stored on a hard drive of a computer system. The computer system has a processor for running both the software program and the routine and is capable of operating in a suspended execution mode. The routine prevents unauthorized access to the software program, such as when the processor is running in the suspended execution mode under a debugger utility program. When the processor is running the software program, the program can initiate execution of the routine. Once initiated, the routine checks a certain predetermined memory location to determine if it is operating in the suspended execution mode and if so, stops the processor from continuing to run the software program.

In one embodiment, the memory location is an interrupt register of the processor, which indicates whether any breakpoints, which are commonly used in debug operating modes, are being used. The routine checks the interrupt register to determine if it points to any other program or routine. If so, then the processor is likely running in debug mode and the routine stops the processor from continuing to run the original program. In another embodiment, the memory location is a flag register of the processor, which indicates whether other operating modes of the processor. In this embodiment, the routine checks the flag register to determine if it indicates a single-step mode of operation for the processor. If so, the routine stops the processor from continuing to run the program.

DETAILED DESCRIPTION OF THE PREFERRED EMBODIMENT

Figure 1:
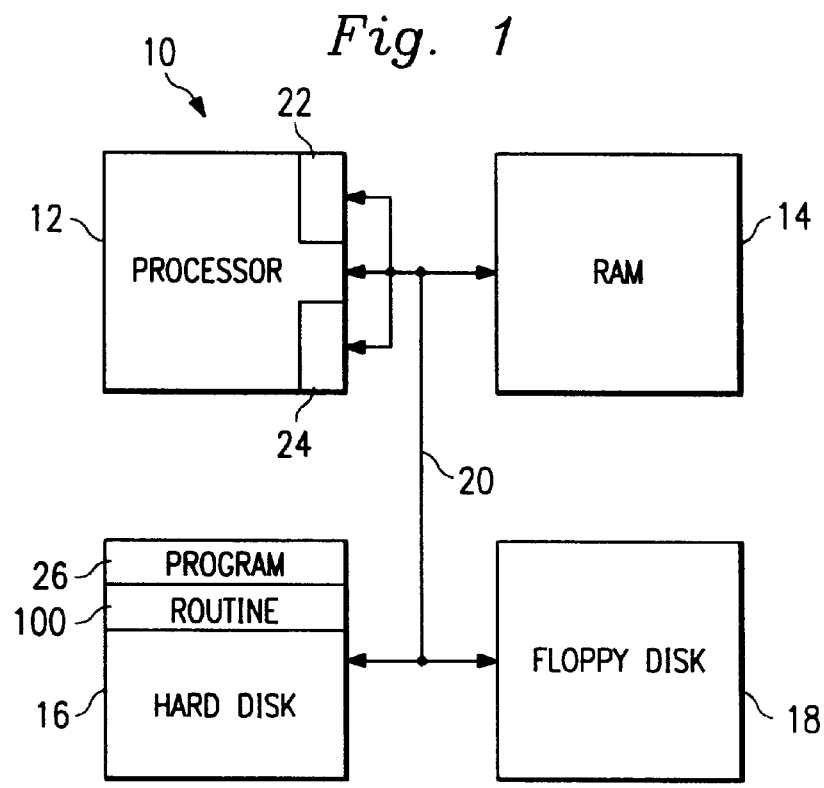
FIG. 1 is a block diagram of a computer for implementing one embodiment.

Referring to FIG. 1, the reference numeral 10 designates a computer having several components, including at least one processor 12, RAM 14, a hard disk drive 16, and a floppy disk drive 18. Each component is capable of communication with the processor 12, as graphically represented by a general bus 20. In the present example, the processor 12 is running DOS operating system code as provided by Microsoft Corp. of Redmond, Wash. It is understood, however, that the computer 10 and its illustrated components are merely representative of many different types of computers and components and that DOS is merely representative of many different types of operating systems, including Windows and Windows 95, also from Microsoft Corp.

The processor 12 includes a plurality of registers, including an INTERRUPT register 22 and a FLAG register 24. The names of the registers 22, 24 relate to the PENTIUM and PENTIUM II processors, but are only meant to be illustrative of similar registers on practically all models and/or brands of processors. The registers 22, 24 are also described in the INTEL ARCHITECTURE SOFTWARE DEVELOPER'S MANUAL, which has already been incorporated by reference and which further describes several different processor operating modes, including a normal mode, a debug mode, and a single-step mode.

Stored on the hard drive 16 is a program executable (.exe) file 26. The program 26 is currently compressed and encrypted using a conventional utility such as PKLITE, described in greater detail above. Since the program 26 is encrypted, a user can not simply read the hard disk 16 to access and decompile the program. Conventionally, however, the user would be able to load the program 26 into RAM 14 and run the program with the processor 12 using a debug utility program (not shown). By so doing, the user could learn each line of code in the program 26 and decompile the program, thereby attaining unauthorized access to the program.

Figure 2:
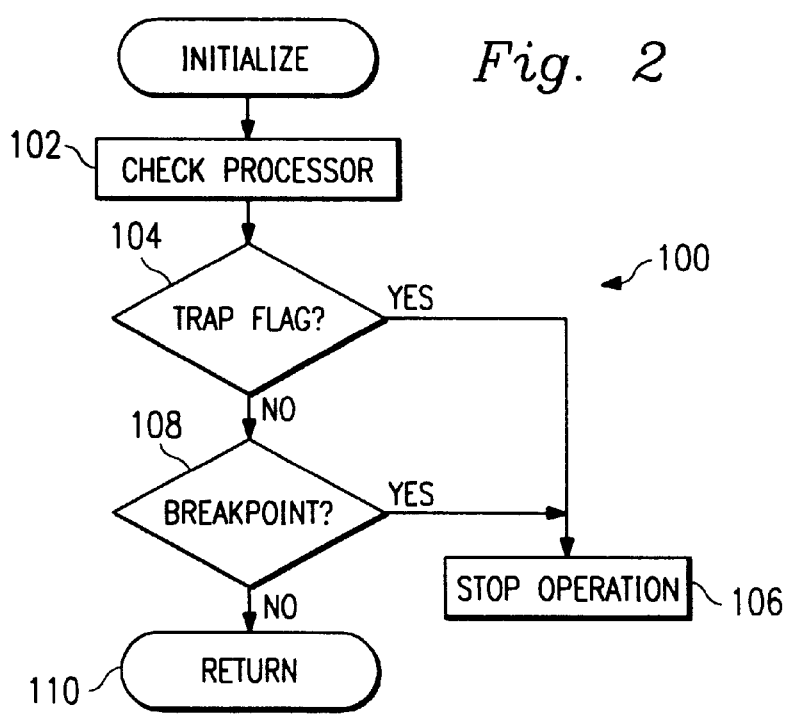
FIG. 2 is a flow chart of a routine to be run by the computer of FIG. 1.

Referring to FIG. 2, a routine 100, which is also stored on the hard disk 16, prevents the user from running the program 26 using the debug utility program. The program 26 launches the routine 100 during initial operation of the program. Therefore, for the sake of example, the routine 100 is an initialize routine, it being understood, however, that the routine 100 may be run at any time the program 26 is being executed.

At step 102, the routine 100 checks the registers 22, 24. Using the Intel PENTIUM processor example discussed above, specifically INTERRUPT register 22 is a Debug Register 7 and the FLAG register 24 is an EFLAG Register. At step 104, the routine 100 determines whether the trap flag (TF) of the EFLAG Register 24 is set. If TF is set, indicating single-step mode, the routine 100 halts execution of the program 26 at step 106. If TF is clear, execution proceeds to step 108, where the routine 100 determines where the breakpoint flag (INT 3) of the INTERRUPT Register 22 points. INT3 may point to a routine such as a breakpoint exception handler routine, which is often used by a debug program, or it may contain a return instruction "IRET", which means that no other program or routine is called. If INT 3 points to any instruction other than IRET, execution proceeds to step 106 described above. Otherwise, execution proceeds to step 110 where the routine 100 returns control to the program 26, which may now proceed normally. By checking the registers 22, 24, the routine 100 knows whether or not the processor 12 is operating in a debug mode, thereby preventing the program 26 from being run under a debugger utility program.

Although illustrative embodiments have been shown and described, a latitude of modification, change and substitution is intended in the foregoing disclosure, and in certain instances, some features will be employed without a corresponding use of other features. For example, the routine 100 may be called repeatedly by the program 26, thereby further ensuring that the program is not being run by a debugger. Furthermore, the program 26 and routine 100 may be stored at different locations, additional or alternative registers, flags, or memory devices may be checked and additional error handling routines may be added to the illustrative embodiment without altering its scope. Accordingly, it is appropriate that the appended claims be construed broadly and in a manner consistent with the scope of the invention.

What is claimed is:

1. A computer comprising:
   at least one processor for executing a software program, the processor capable of operating in a suspended execution mode and having a first memory location that indicates whether the processor is currently operating in the suspended execution mode;
   a storage device accessible by the processor; and
   a routine stored in the storage device;
   wherein, when the processor is executing the software program, the software program is capable of initiating the routine; and
   wherein, once initiated, the routine checks the first memory location to determine if the processor is in the suspended execution mode; and
   wherein responsive to a determination that the processor is in the suspended execution mode, the routine stops the processor from continuing to execute the software program; and
   wherein responsive to a determination that the processor is not in the suspended execution mode, the routine returns control of the processor to the software program.

2. The computer of claim 1 wherein the first memory location is an interrupt register of the processor.

3. The computer of claim 1 wherein the first memory location is a flag register of the processor.

4. The computer of claim 1 wherein the processor further includes a second memory location, the first memory location being an interrupt register and the second memory location being a flag register, and wherein either of the two registers may indicate whether the processor is currently operating in the suspended execution mode.

5. The computer of claim 1 wherein the suspended execution mode is a debug mode.

6. The computer of claim 1 wherein the suspended execution mode is a single-step mode.

7. The computer of claim 1 wherein the storage device is a hard disk.

8. The computer of claim 1 wherein the storage device is a floppy disk.

9. The computer of claim 1 wherein the storage device is random access memory.

10. A method for preventing a user from running a program on a processor operating in a suspended execution mode, the method comprising the steps of:
    checking a first predetermined memory location;
    determining if the first memory location indicates that the processor is operating in a suspended execution mode; and
    responsive to a determination that the processor is operating in the suspended execution mode, halting execution of the program by the processor; and
    responsive to a determination that the processor is not operating in the suspended execution mode, returning to execution of the program by the processor.

11. The method of claim 10 further comprising:
    checking a second predetermined memory location;
    determining if the second memory location indicates a suspended execution mode of operation for the processor; and
    if so, stopping the processor from continuing to run the program.

12. The method of claim 10 wherein the first memory location is an interrupt register of the processor.

13. The method of claim 11 wherein the first memory location is an interrupt register of the processor and the second memory location is a flag register of the processor.

14. The method of claim 10 wherein the suspended execution mode of operation is a single-step mode.

15. The method of claim 11 wherein the suspended execution mode of operation is a debug mode.

16. A device for preventing a user from running a program on a processor operating in debug mode, the device comprising:
    means for checking a first predetermined memory location;
    means for determining if the first memory location indicates that the processor is operating in a suspended execution mode; and
    means responsive to a determination that the processor is operating in the suspended execution mode for halting execution of the program by the processor, said means further being responsive to a determination that the processor is not operating in the suspended execution mode for returning to execution of the program by the processor.

17. The device of claim 16 further comprising:
    means for checking a second predetermined memory location;
    means for determining if the second memory location points to another routine; and
    means responsive to determining that the second memory location points to another routine for stopping the processor from continuing to run the program.

18. The device of claim 16 wherein the first memory location is a flag register of the processor.

19. The device of claim 17 wherein the first memory location is a flag register of the processor and the second memory location is an interrupt register of the processor.

20. The device of claim 16 wherein the suspended execution mode of operation is one of either a single-step mode or a debug mode.

* * * * *